United States Patent
John Wilson et al.

(10) Patent No.: US 11,638,289 B2
(45) Date of Patent: Apr. 25, 2023

(54) TECHNIQUES AND APPARATUSES FOR NESTING A NEW RADIO SYSTEM AND A LONG TERM EVOLUTION SYSTEM

(71) Applicant: QUALCOMM Incorporated, San Diego, CA (US)

(72) Inventors: Makesh Pravin John Wilson, San Diego, CA (US); Xiao Feng Wang, San Diego, CA (US); Tao Luo, San Diego, CA (US); Sony Akkarakaran, Poway, CA (US); Wooseok Nam, San Diego, CA (US); Sumeeth Nagaraja, Los Altos, CA (US); Shengbo Chen, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/949,328

(22) Filed: Oct. 26, 2020

(65) Prior Publication Data
US 2021/0045097 A1 Feb. 11, 2021

Related U.S. Application Data

(63) Continuation of application No. 15/973,363, filed on May 7, 2018, now Pat. No. 10,827,474.
(Continued)

(51) Int. Cl.
*H04W 72/04* (2009.01)
*H04W 72/23* (2023.01)
(Continued)

(52) U.S. Cl.
CPC ........... *H04W 72/23* (2023.01); *H04L 1/0026* (2013.01); *H04L 1/0028* (2013.01);
(Continued)

(58) Field of Classification Search
CPC . H04W 24/10; H04W 72/042; H04W 84/045; H04W 16/14; H04L 1/0026; H04L 1/0028; H04L 1/0031; H04L 5/0048
See application file for complete search history.

(56) References Cited

U.S. PATENT DOCUMENTS

2014/0233419 A1  8/2014 Cheng et al.
2014/0269460 A1  9/2014 Papasakellariou et al.
(Continued)

FOREIGN PATENT DOCUMENTS

CN  103095398 A  5/2013
CN  106231637 A  12/2016

OTHER PUBLICATIONS

Ericsson: "LTE NR Inter-RAT Measurement", 3GPP Draft; [NR CP] R2-166929—LTE NR Inter-RAT Measurement, 3rd Generation Partnership Project (3GPP), Mobile Competence Centre; 650, Route Des Lucioles; F-06921, Sophia-Antipolis Cedex; France, vol. RAN WG2, No. Kaohsiung, Taiwan; Oct. 10, 2016-Oct. 14, 2016, Oct. 9, 2016, XP051150456, Retrieved from the Internet: URL:http://www.3gpp.org/ftp/Meetings_3GPP_SYNC/RAN2/Docs/[retrieved on Oct. 9,2016], 3 pages.
(Continued)

*Primary Examiner* — Rina C Pancholi
(74) *Attorney, Agent, or Firm* — Harrity & Harrity, LLP \ Qualcomm

(57) ABSTRACT

Certain aspects of the present disclosure generally relate to wireless communication. In some aspects, a UE may measure a first reference signal, associated with a frequency band of a long term evolution (LTE) system, and a second reference signal associated with a frequency band of a new radio (NR) system. The frequency band of the NR system may overlap the frequency band of the LTE system. The UE may determine first channel state feedback, associated with the frequency band of the LTE system, and second channel state feedback, associated with the frequency band of the NR system, based at least in part on the first reference signal and
(Continued)

the second reference signal, respectively. The UE may report the first channel state feedback or the second channel state feedback in uplink control information (UCI). Other aspects are provided.

30 Claims, 13 Drawing Sheets

Related U.S. Application Data

(60) Provisional application No. 62/503,707, filed on May 9, 2017.

(51) Int. Cl.
| | | |
|---|---|---|
| *H04W 24/10* | (2009.01) | |
| *H04L 1/00* | (2006.01) | |
| *H04L 5/00* | (2006.01) | |
| *H04W 16/14* | (2009.01) | |
| *H04W 84/04* | (2009.01) | |

(52) U.S. Cl.
CPC ........... *H04L 5/0048* (2013.01); *H04W 24/10* (2013.01); *H04L 1/0031* (2013.01); *H04W 16/14* (2013.01); *H04W 84/045* (2013.01)

(56) References Cited

U.S. PATENT DOCUMENTS

| | | |
|---|---|---|
| 2016/0294454 A1 | 10/2016 | Onggosanusi et al. |
| 2017/0257774 A1 | 9/2017 | Ghosh et al. |
| 2017/0331670 A1 | 11/2017 | Parkvall et al. |
| 2018/0014247 A1 | 1/2018 | Chandramouli et al. |
| 2018/0041925 A1 | 2/2018 | Yilmaz et al. |
| 2018/0091992 A1 | 3/2018 | Frenne et al. |
| 2018/0198569 A1 | 7/2018 | Lyu et al. |
| 2018/0199302 A1 | 7/2018 | Yi et al. |
| 2018/0220340 A1 | 8/2018 | Ramachandra et al. |
| 2018/0287760 A1* | 10/2018 | Choi ...................... H04J 11/005 |
| 2018/0288657 A1 | 10/2018 | Stojanovski et al. |
| 2018/0302831 A1 | 10/2018 | Fan et al. |
| 2018/0332567 A1 | 11/2018 | John et al. |
| 2018/0375698 A1 | 12/2018 | Zhang et al. |
| 2019/0089498 A1* | 3/2019 | Pelletier .................. H04L 5/005 |
| 2019/0182732 A1 | 6/2019 | Wei et al. |
| 2019/0281610 A1* | 9/2019 | Choi ...................... H04L 5/001 |

OTHER PUBLICATIONS

International Preliminary Report on Patentability—PCT/US2018/031621, The International Bureau of WIPO—Geneva, Switzerland, dated Nov. 21, 2019.
International Search Report and Written Opinion—PCT/US2018/031621—ISA/EPO—dated Aug. 6, 2018.
LG Electronics: "On Coexistence of NR and LTE", 3GPP Draft; R1-166924, 3rd Generation Partnership Project (3GPP), Mobile Competence Centre; 650, Route Des Lucioles; F-06921, Sophia-Antipolis Cedex; France, vol. RAN WG1, No. Gothenburg, Sweden; Aug. 22, 2016-Aug. 26, 2016, Aug. 21, 2016, XP051125648, Retrieved from the Internet: URL:http://www.3gpp.org/ftp/Meetings_3GPP_SYNC/RAN1/Docs/ [retrieved on Aug. 21, 2016], 3 pages.

* cited by examiner

TECHNIQUES AND APPARATUSES FOR NESTING A NEW RADIO SYSTEM AND A LONG TERM EVOLUTION SYSTEM

CROSS REFERENCE TO RELATED APPLICATIONS UNDER 35 U.S.C. § 119

This application is a continuation of U.S. patent application Ser. No. 15/973,363 filed May 7, 2018 (now U.S. Pat. No. 10,827,474) entitled "TECHNIQUES AND APPARATUSES FOR NESTING A NEW RADIO SYSTEM AND A LONG TERM EVOLUTION SYSTEM," which claims priority to U.S. Provisional Patent Application No. 62/503,707 filed on May 9, 2017 entitled "TECHNIQUES AND APPARATUSES FOR NESTING A NEW RADIO SYSTEM AND A LONG TERM EVOLUTION SYSTEM," which are incorporated by reference herein.

FIELD OF THE DISCLOSURE

Aspects of the present disclosure generally relate to wireless communication, and more particularly to techniques and apparatuses for nesting a new radio (NR) system and a long term evolution (LTE) system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a user equipment (UE) may include obtaining synchronization information, associated with a frequency band of a LTE system, based at least in part on a set of synchronization signals associated with the frequency band of the LTE system; and receiving, based at least in part on a quasi co-location (QCL) indication and the synchronization information, a reference signal associated with a frequency band of a NR system, wherein the QCL indication includes information indicating quasi co-location between the reference signal, associated with the frequency band of the NR system, and the set of synchronization signals associated with the frequency band of the LTE system, and wherein the frequency band of the NR system overlaps the frequency band of the LTE system.

In some aspects, a UE for wireless communication may include one or more processors configured to obtain synchronization information, associated with a frequency band of a LTE system, based at least in part on a set of synchronization signals associated with the frequency band of the LTE system; and receive, based at least in part on a QCL indication and the synchronization information, a reference signal associated with a frequency band of a NR system, wherein the QCL indication includes information indicating quasi co-location between the reference signal, associated with the frequency band of the NR system, and the set of synchronization signals associated with the frequency band of the LTE system, and wherein the frequency band of the NR system overlaps the frequency band of the LTE system.

In some aspects, a non-transitory computer-readable medium may store one or more instructions for wireless communication. The one or more instructions, when executed by one or more processors of a UE, may cause the one or more processors to obtain synchronization information, associated with a frequency band of a LTE system, based at least in part on a set of synchronization signals associated with the frequency band of the LTE system; and receive, based at least in part on a QCL indication and the synchronization information, a reference signal associated with a frequency band of a NR system, wherein the QCL indication includes information indicating quasi co-location between the reference signal, associated with the frequency band of the NR system, and the set of synchronization signals associated with the frequency band of the LTE system, and wherein the frequency band of the NR system overlaps the frequency band of the LTE system.

In some aspects, an apparatus for wireless communication may include means for obtaining synchronization information, associated with a frequency band of a LTE system, based at least in part on a set of synchronization signals associated with the frequency band of the LTE system; and means for receiving, based at least in part on a QCL indication and the synchronization information, a reference signal associated with a frequency band of a NR system, wherein the QCL indication includes information indicating quasi co-location between the reference signal, associated with the frequency band of the NR system, and the set of synchronization signals associated with the frequency band of the LTE system, and wherein the frequency band of the NR system overlaps the frequency band of the LTE system.

In some aspects, a method for wireless communication performed by a UE may include measuring a reference signal associated with a frequency band of a LTE system; and determining channel state feedback, associated with a frequency band of a NR system, based at least in part on the reference signal associated with the frequency band of the LTE system, wherein the frequency band of the NR system overlaps the frequency band of the LTE system.

In some aspects, a UE for wireless communication may include one or more processors configured to measure a reference signal associated with a frequency band of a LTE system; and determine channel state feedback, associated with a frequency band of a NR system, based at least in part on the reference signal associated with the frequency band of the LTE system, wherein the frequency band of the NR system overlaps the frequency band of the LTE system.

In some aspects, a non-transitory computer-readable medium may store one or more instructions for wireless communication. The one or more instructions, when executed by one or more processors of a UE, may cause the one or more processors to measure a reference signal associated with a frequency band of a LTE system; and determine channel state feedback, associated with a frequency band of a NR system, based at least in part on the reference signal associated with the frequency band of the LTE system, wherein the frequency band of the NR system overlaps the frequency band of the LTE system.

In some aspects, an apparatus for wireless communication may include means for measuring a reference signal associated with a frequency band of a LTE system; and means for determining channel state feedback, associated with a frequency band of a NR system, based at least in part on the reference signal associated with the frequency band of the LTE system, wherein the frequency band of the NR system overlaps the frequency band of the LTE system.

In some aspects, a method for wireless communication performed by a UE may include measuring a first reference signal, associated with a frequency band of a LTE system, and a second reference signal associated with a frequency band of a NR system, wherein the frequency band of the NR system overlaps the frequency band of the LTE system; determining first channel state feedback, associated with the frequency band of the LTE system, and second channel state feedback, associated with the frequency band of the NR system, based at least in part on the first reference signal and the second reference signal, respectively; and reporting the first channel state feedback or the second channel state feedback in uplink control information (UCI).

In some aspects, a UE for wireless communication may include one or more processors configured to measure a first reference signal, associated with a frequency band of a LTE system, and a second reference signal associated with a frequency band of a NR system, wherein the frequency band of the NR system overlaps the frequency band of the LTE system; determine first channel state feedback, associated with the frequency band of the LTE system, and second channel state feedback, associated with the frequency band of the NR system, based at least in part on the first reference signal and the second reference signal, respectively; report the first channel state feedback or the second channel state feedback in UCI.

In some aspects, a non-transitory computer-readable medium may store one or more instructions for wireless communication. The one or more instructions, when executed by one or more processors of a UE, may cause the one or more processors to measure a first reference signal, associated with a frequency band of a LTE system, and a second reference signal associated with a frequency band of a NR system, wherein the frequency band of the NR system overlaps the frequency band of the LTE system; determine first channel state feedback, associated with the frequency band of the LTE system, and second channel state feedback, associated with the frequency band of the NR system, based at least in part on the first reference signal and the second reference signal, respectively; and report the first channel state feedback or the second channel state feedback in UCI.

In some aspects, an apparatus for wireless communication may include means for measuring a first reference signal, associated with a frequency band of a LTE system, and a second reference signal associated with a frequency band of a NR system, wherein the frequency band of the NR system overlaps the frequency band of the LTE system; means for determining first channel state feedback, associated with the frequency band of the LTE system, and second channel state feedback, associated with the frequency band of the NR system, based at least in part on the first reference signal and the second reference signal, respectively; and means for reporting the first channel state feedback or the second channel state feedback in UCI.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
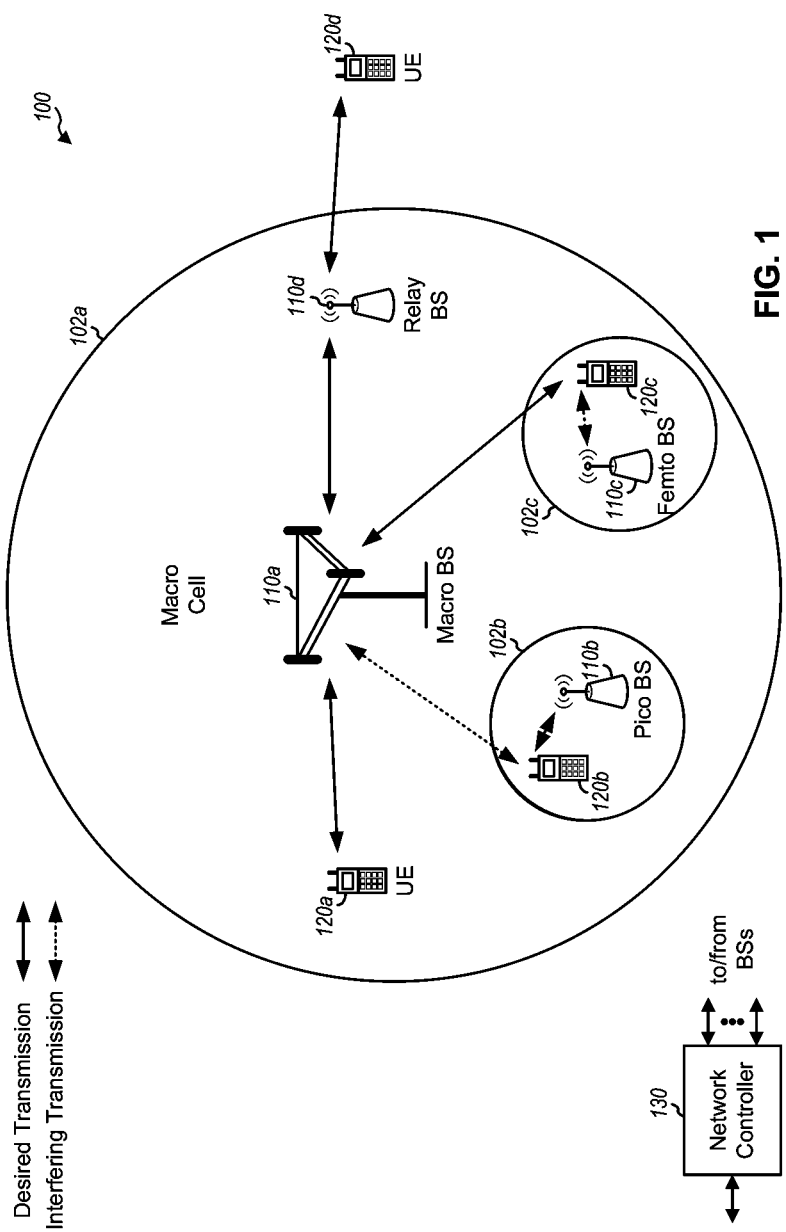
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be a 5G or NR network or some other wireless network, such as an LTE network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing 120' that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
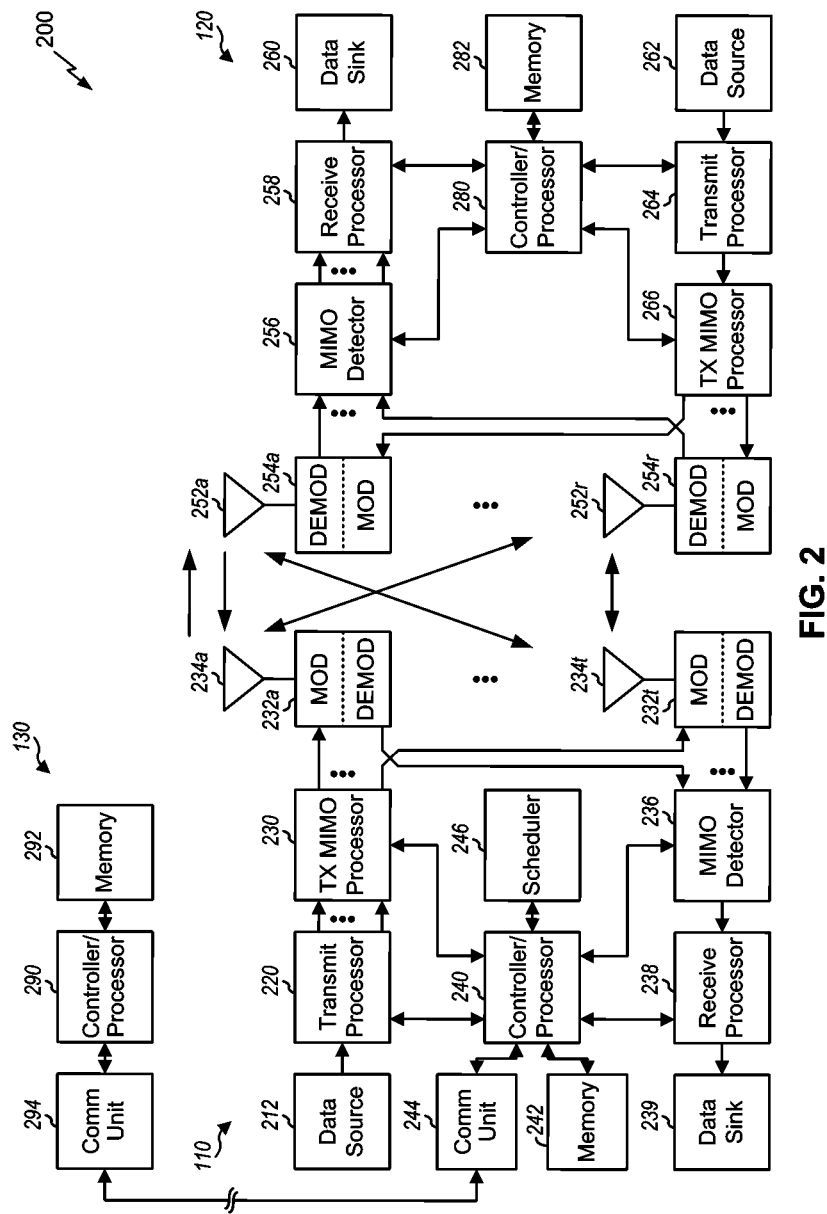
FIG. 2 shows a block diagram conceptually illustrating an example of a base station in communication with a UE in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS), the secondary synchronization signal (SSS), the tertiary synchronization signal (TSS), and/or the like). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform operations associated with nesting a NR system and a LTE system, respectively, as described herein. For example, controller/processor 280 and/or other processors and modules at UE 120, may perform or direct operations of UE 120 to perform one or more operations associated with nesting a NR system and a LTE system. For example, controller/processor 280 and/or other controllers/processors and modules at UE 120 may perform or direct operations of, for example, process 1000 of FIG. 10, process 1200 of FIG. 12, process 1400 of FIG. 14, and/or other processes as described herein. In some aspects, one or more of the components shown in FIG. 2 may be employed to perform example process 1000, example process 1200, example process 1400, and/or other processes for the techniques described herein. Memories 242 and 282 may store data and program codes for base station 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
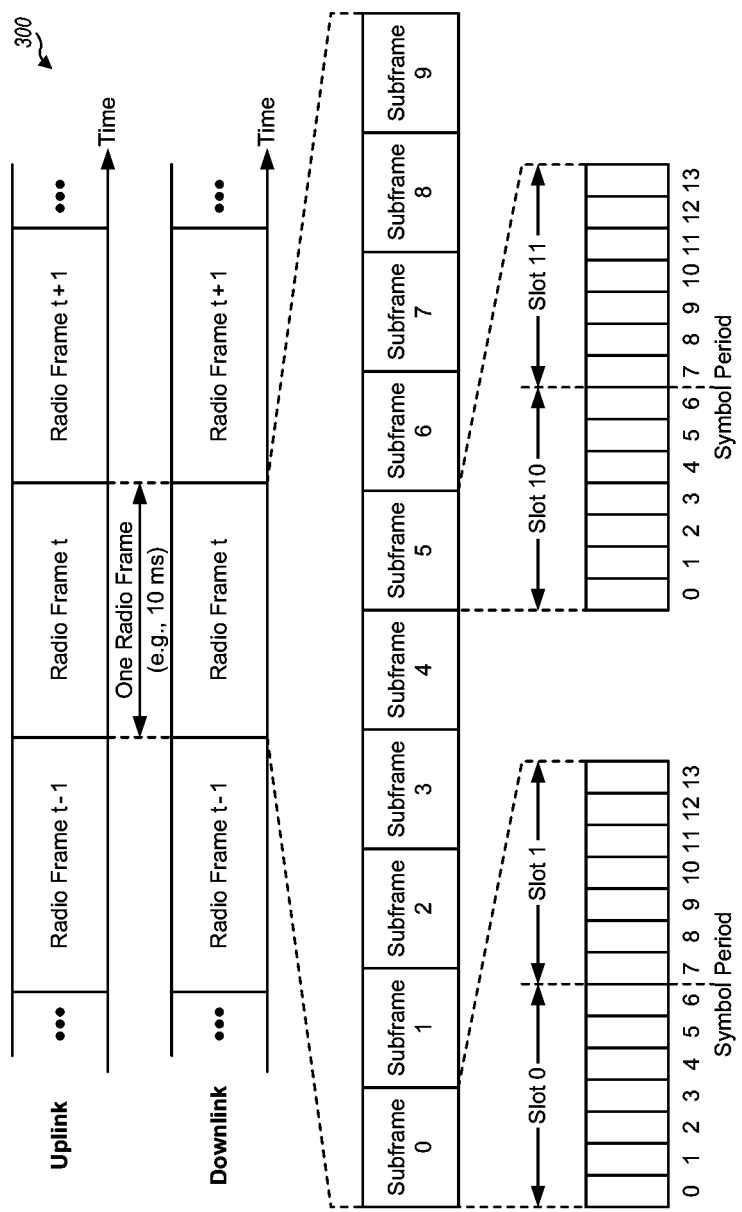
FIG. 3 is a block diagram conceptually illustrating an example of a frame structure in a wireless communication network, in accordance with various aspects of the present disclosure.

FIG. 3 shows an example frame structure 300 for FDD in a telecommunications system (e.g., NR). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., NR), a BS may transmit a primary synchronization signal (PSS), a secondary synchronization signal (SSS), and tertiary synchronization signal (TSS) on the downlink for each cell supported by the BS. The PSS and SSS may be used by UEs for cell search and acquisition. For example, the PSS may be used by UEs to determine symbol timing, and the SSS may be used by UEs to determine a physical cell identifier, associated with the BS, and frame timing. A TSS may be used by UEs to identify a beam associated with the PSS and/or the SSS. For example, in a case where the BS and a UE communicate using a multi-beam communication technique (e.g., whereby the BS communicates with the UE via multiple beams), the BS may transmit a TSS that may be used by the UE to identify the beam associated with the PSS and/or the SSS. The BS may also transmit a physical broadcast channel (PBCH). The PBCH may carry some system information, such as system information that supports initial access by UEs.

The BS may transmit other system information such as system information blocks (SIBs) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIG. 3 is provided merely as an example. Other examples are possible and may differ from what was described with regard to FIG. 3.

Figure 4:
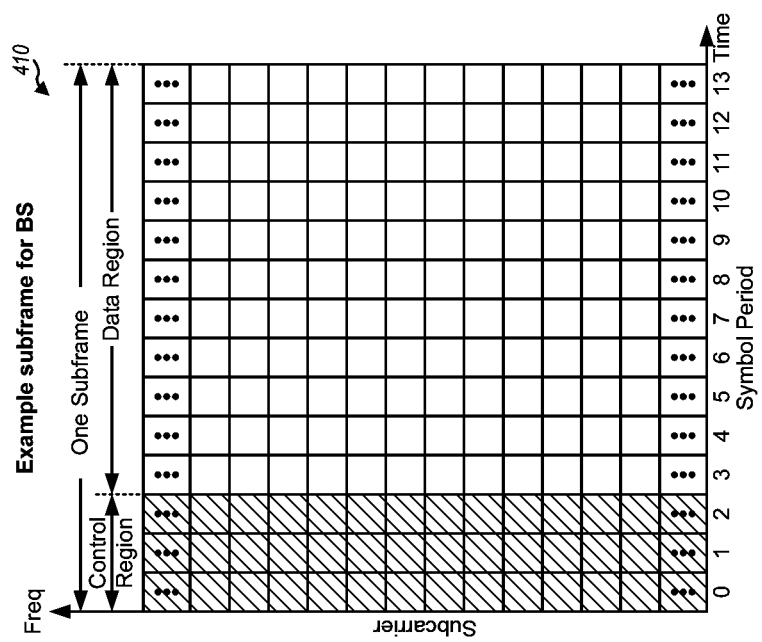
FIG. 4 is a block diagram conceptually illustrating an example subframe format with the normal cyclic prefix, in accordance with various aspects of the present disclosure.

FIG. 4 shows an example subframe format 410 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where q E {0, . . . ,Q-1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems.

New radio (NR) may refer to radios configured to operate according to a new air interface or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
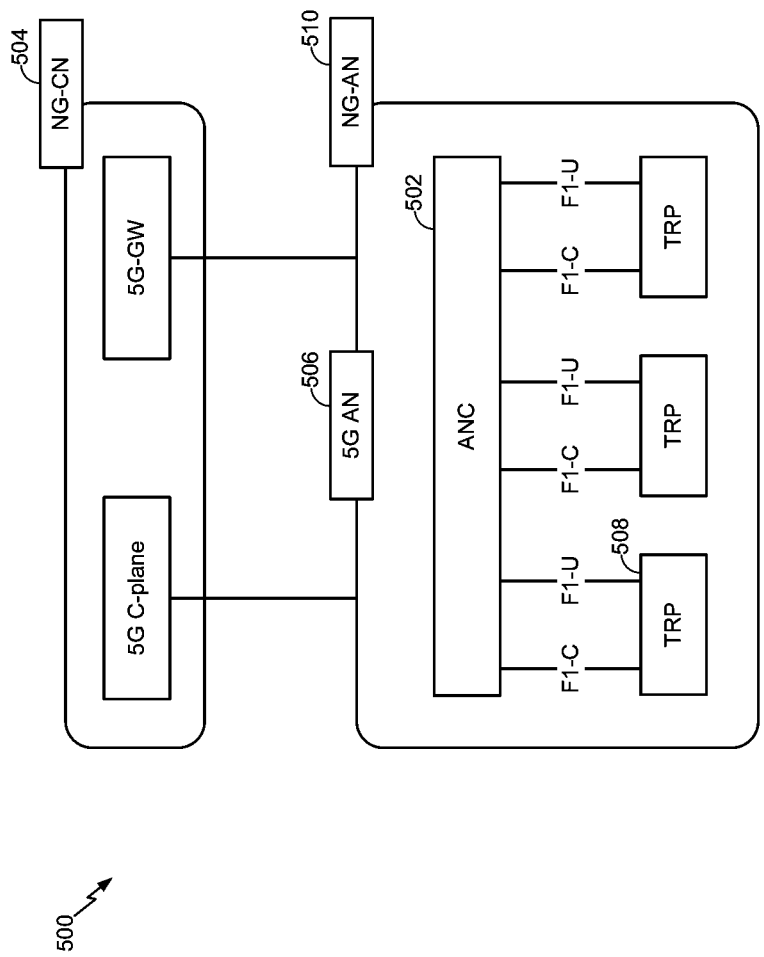
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
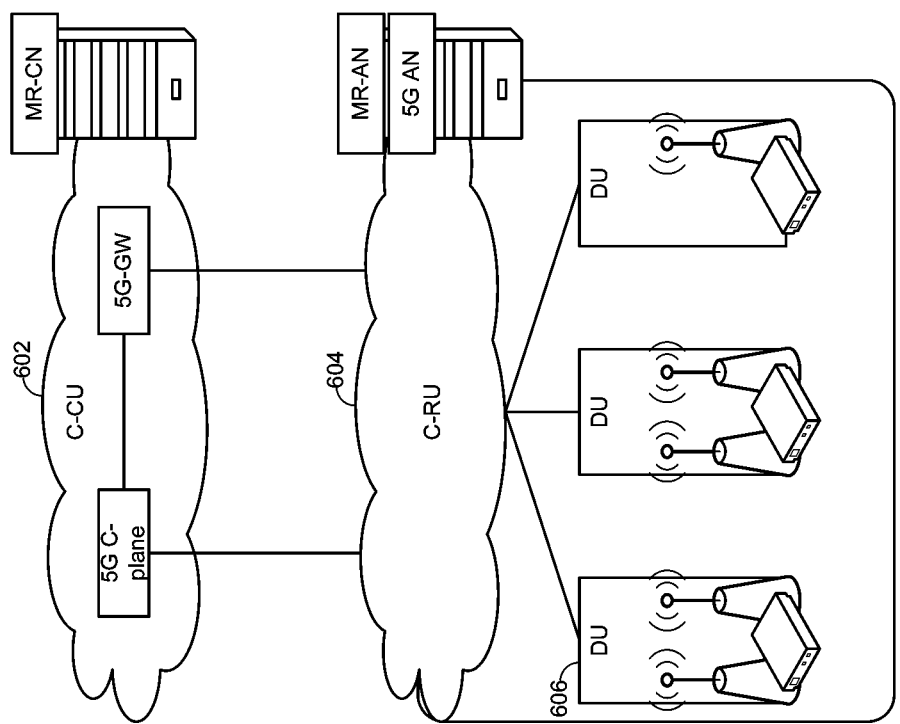
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
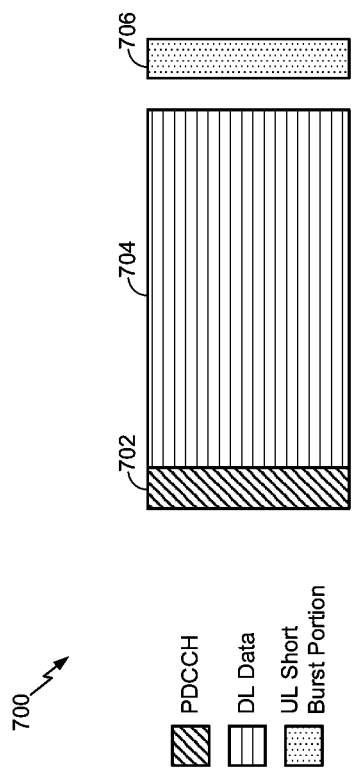
FIG. 7 is a diagram illustrating an example of a downlink (DL)-centric subframe, in accordance with various aspects of the present disclosure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
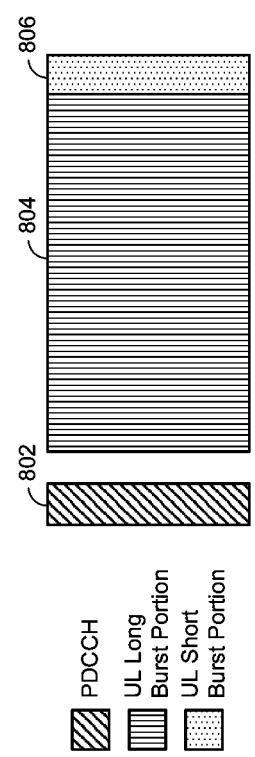
FIG. 8 is a diagram illustrating an example of an uplink (UL)-centric subframe, in accordance with various aspects of the present disclosure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A NR system (e.g., a network that utilizes NR radio access technology) may be capable of operating in the same frequency band as a LTE system (e.g., a network that utilizes LTE radio access technology). For example, the NR system may be capable of operating within a given frequency band (e.g., with a subcarrier spacing of 60 kHz), where one or more sub-bands within the given frequency band overlap with one or more frequency bands (e.g., with a sub-carrier spacing of 15 kHz) utilized by the LTE system. Thus, the one or more frequency bands, utilized by the LTE system, may be "reused" by the NR system in order to support the NR system. However, use of these overlapping frequency bands should be such that the NR system does not disrupt, interrupt, or otherwise negatively impact operation of the LTE system.

For example, a set of resources (e.g., a subframe, a portion of a subframe, and/or the like) in the LTE frequency band may be utilized for a NR transmission when the set of resources is not being utilized by the LTE system (e.g., when no synchronization signal (SS) or PBCH is being transmitted in a set of downlink resources, when there are no UEs connected to a base station associated with the LTE system, and/or the like). As another example, a NR transmission may be time division multiplexed with a LTE transmission in a given LTE subframe (e.g., a mini-slot within the LTE subframe may be utilized for the NR transmission). In some cases, the nesting of the NR and LTE systems may be implemented for uplink and downlink transmissions, and may be implemented when the LTE system and/or the NR system are time division duplexed (TDD) and/or frequency division duplexed (FDD) systems.

Some aspects described herein provide techniques and apparatuses for nesting a NR system and a LTE system such that resources in a frequency band, utilized by both the NR system and the LTE system, can be concurrently and opportunistically utilized by both the NR system and the LTE system without negatively affecting performance of either the NR system or the LTE system.

Figure 9:
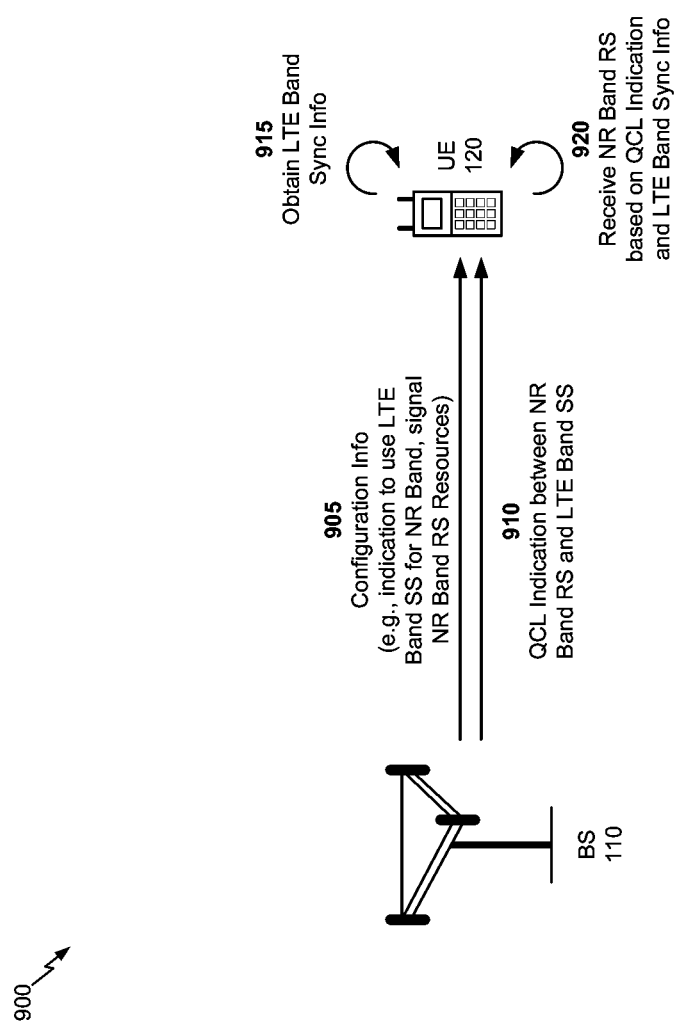
FIG. 9 is a diagram illustrating an example of a set of synchronization signals, associated with a LTE system, being utilized by a NR system, in accordance with various aspects of the present disclosure.

FIG. 9 is a diagram illustrating an example 900 of a set of synchronization signals, associated with a LTE system, being utilized by a NR system, in accordance with various aspects of the present disclosure.

As shown in FIG. 9, and by reference number 905, UE 120 may receive, from BS 110, configuration information associated with a frequency band utilized by the LTE system (herein referred to as the LTE frequency band) and a frequency band utilized by the NR system (herein referred to as the NR frequency band).

In some aspects, as described above, the NR frequency band may overlap the LTE frequency band. For example, the NR system may be configured to operate within a given frequency band (e.g., with a subcarrier spacing of 60 kHz), where one or more sub-bands of the given frequency band overlap the LTE frequency band (e.g., with a sub-carrier spacing of 15 kHz). In some aspects, multiple sub-bands of the NR frequency band may overlap multiple LTE frequency bands (e.g., the NR frequency band with the subcarrier spacing of 60 kHz may overlap multiple LTE frequency bands, each with a subcarrier spacing of 15 kHz), wherein at least a portion of each of the multiple LTE frequency bands is overlapped by the NR frequency band.

In some aspects, the configuration information may include information associated with configuring UE 120 to utilize synchronization information, associated with the LTE band, for synchronization associated with the NR frequency band. For example, the configuration information may include information indicating that UE 120 is to use synchronization information, determined based at least in part on a set of synchronization signals associated with the LTE frequency band (e.g., a PSS, a SSS, and/or the like), for synchronization associated with the NR frequency band. In some aspects, UE 120 may receive a reference signal, associated with NR frequency band, based at least in part on the synchronization information associated with the LTE frequency band, as described below.

As further shown, in some aspects, the configuration information may include information that signals resources that carry the reference signal associated with the NR frequency band (e.g., a channel state information reference signal (CSI-RS), a DMRS associated with a PDCCH, a DMRS associated with a PDSCH, and/or the like).

In some aspects, UE 120 may receive the configuration information in one or more transmissions from BS 110. In some aspects, the configuration information may be received in resources of another sub-band of the NR frequency band (e.g., a sub-band of the NR frequency band that does not overlap the LTE frequency band) and/or in resources of another NR frequency band.

As shown by reference number 910, UE 120 may receive, from BS 110, a quasi co-location (QCL) indication associated with the reference signal and the set of synchronization signals. In some aspects, the QCL indication may include information indicating quasi co-location between the set of synchronization signals, associated with the LTE frequency band, and the reference signal, associated with the NR frequency band, with respect to at least one or more QCL parameters. Such QCL parameters may include, for example, a Doppler shift, a Doppler spread, an average delay, a delay spread, and/or the like. In some aspects, based at least in part on the QCL indication, UE 120 may receive the reference signal, associated with the NR frequency band, as described below.

As shown by reference number 915, UE 120 may obtain synchronization information associated with the LTE frequency band. For example, based at least in part on the indication to use the set of synchronization signals associated with the LTE frequency band, UE 120 may receive the set of synchronization signals (e.g., the PSS, the SSS, and/or the like). Here, based at least in part on the set of synchronization signals, UE 120 may obtain the synchronization information. In some aspects, the synchronization information may include information that allows UE 120 to achieve synchronization (e.g., radio frame synchronization, sub-frame synchronization, slot synchronization, symbol synchronization, and/or the like) in the time domain; identify a center of a channel bandwidth in the frequency domain, and/or the like. In some aspects, the synchronization information may include, for example, information that identifies a resource element location, scrambling sequence information, shift information (e.g., a $v_{shift}$ parameter), a number of ports, and/or the like.

As shown by reference number 920, UE 120 may receive the reference signal, associated with the NR frequency band, based at least in part on the QCL indication and the synchronization information. For example, UE 120 may use timing and/or frequency information, identified by the synchronization information and modified based at least in part on one or more QCL parameters, in order to receive the reference signal associated with the NR frequency band (e.g., in the resources signaled by BS 110, as described above).

In some aspects, UE 120 may receive other transmissions associated with the NR system. For example, UE 120 may receive a PDCCH, associated with the frequency band of the NR system, based at least in part on the QCL indication and the synchronization information.

In this way, a set of synchronization signals may be shared by the LTE system and the NR system, thereby improving utilization efficiency of the resources in the overlapping NR and LTE frequency bands. Notably, performance of the LTE system is not negatively impacted by use of the set of synchronization signals for allowing UE 120 to receive the reference signal associated with the NR frequency band (e.g., synchronization of a LTE-configured UE is not affected by use of the set of synchronization signals by the NR system).

As indicated above, FIG. 9 is provided as an example. Other examples are possible and may differ from what was described with respect to FIG. 9.

Figure 10:
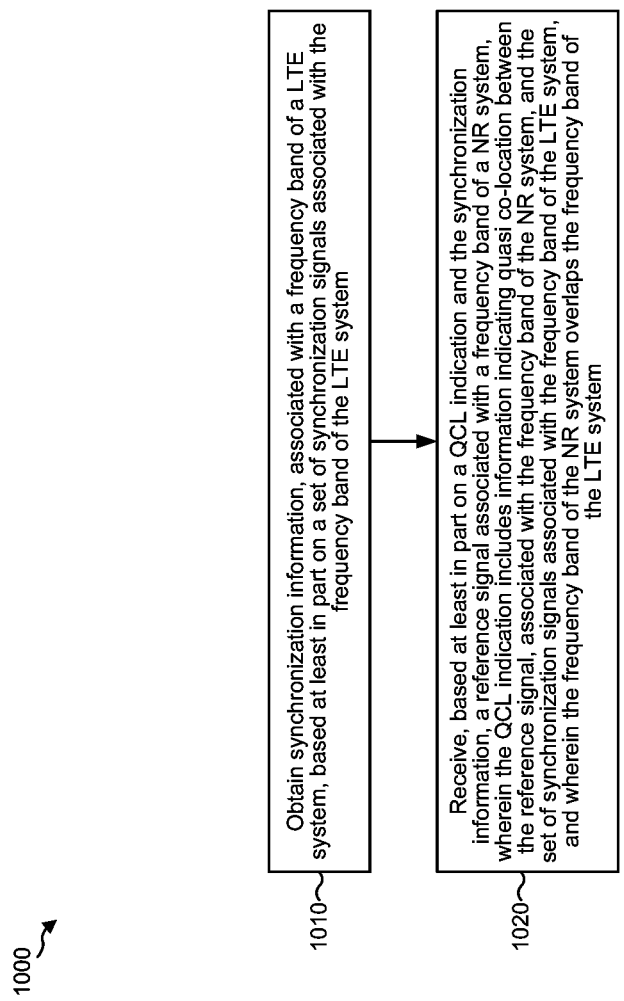
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure.

As shown in FIG. 10, in some aspects, process 1000 may include obtaining synchronization information, associated with a frequency band of a LTE system, based at least in part on a set of synchronization signals associated with the frequency band of the LTE system (block 1010). For example, UE 120 may obtain synchronization information, associated with a frequency band of a LTE system, based at least in part on a set of synchronization signals associated with the frequency band of the LTE system, as described above.

As further shown in FIG. 10, in some aspects, process 1000 may include receiving, based at least in part on a QCL indication and the synchronization information, a reference signal associated with a frequency band of a NR system, wherein the QCL indication includes information indicating quasi co-location between the reference signal, associated with the frequency band of the NR system, and the set of synchronization signals associated with the frequency band of the LTE system, and wherein the frequency band of the NR system overlaps the frequency band of the LTE system (block 1020). For example, UE 120 may receive, based at least in part on a QCL indication and the synchronization information, a reference signal associated with a frequency band of a NR system, as described above.

Process 1000 may include additional aspects, such as any single aspect or any combination of aspects described below and/or described with regard to any other process described herein.

In some aspects, UE 120 may receive configuration information indicating that UE 120 is to receive the reference signal, associated with the frequency band of the NR system, based at least in part on the set of synchronization signals associated with the frequency band of the LTE system. Here the configuration information may be received via another frequency band of the NR system.

In some aspects, UE 120 may receive configuration information that signals resources in the frequency band of the NR system that include the reference signal associated with the frequency band of the NR system. Here, the configuration information may be received via another frequency band of the NR system.

In some aspects, UE 120 may receive, based at least in part on the QCL indication and the synchronization information, a PDCCH associated with the frequency band of the NR system.

In some aspects, the QCL indication may include information indicating quasi co-location between the set of synchronization signals and the reference signal with respect to at least one or more of a Doppler shift, a Doppler spread, an average delay, or a delay spread.

In some aspects, the set of synchronization signals may include at least one of a PSS ora SSS.

In some aspects, the reference signal may include a CSI-RS, a DMRS associated with a PDCCH, or a DMRS associated with a PDSCH.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
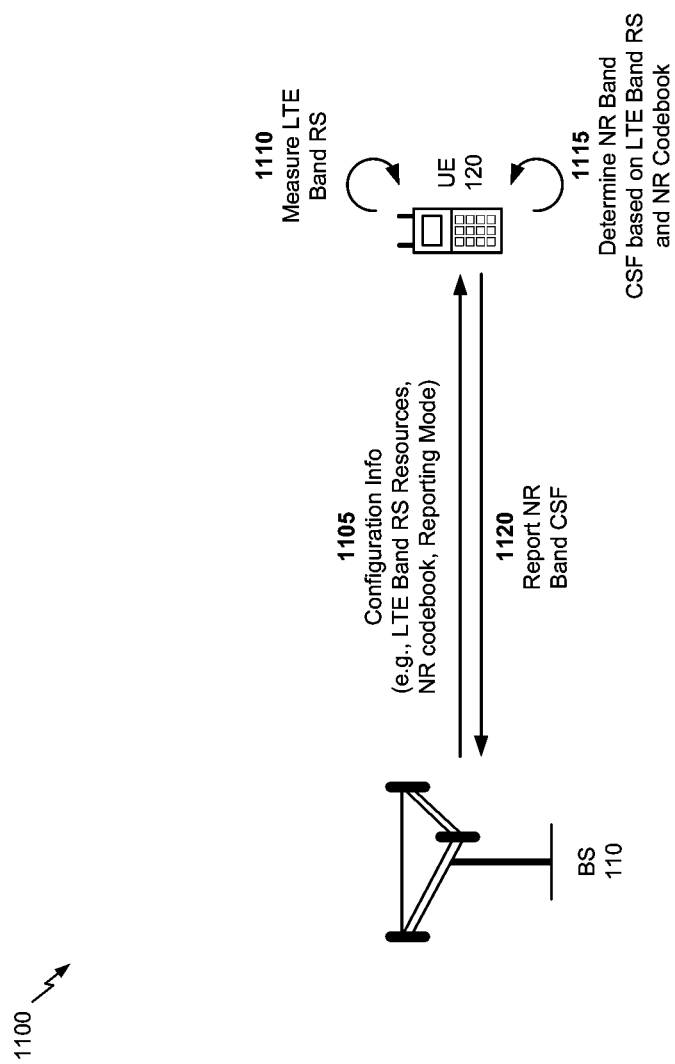
FIG. 11 is a diagram illustrating an example of a reference signal, associated with a LTE system, being utilized for determining channel state feedback associated with a NR system, in accordance with various aspects of the present disclosure.

FIG. 11 is a diagram illustrating an example 1100 of a reference signal, associated with a LTE system, being utilized for determining channel state feedback associated with a NR system, in accordance with various aspects of the present disclosure.

As shown in FIG. 11, and by reference number 1105, UE 120 may receive, from BS 110, configuration information associated with a LTE frequency band and a NR frequency band. In some aspects, as described above, the NR frequency band may overlap the LTE frequency band.

In some aspects, as shown in FIG. 11, the configuration information may include information that signals resources that carry a reference signal associated with the LTE frequency band (e.g., resources that carry a CSI-RS, a set of interference measurement resources (IMRs), and/or the like). In some aspects, UE 120 may determine channel state feedback, associated with the NR frequency band, based at least in part on the reference signal associated with the LTE frequency band, as described below.

In some aspects, the configuration information may include information that identifies a codebook associated with the NR frequency band (herein referred to as NR codebook). In some aspects, the NR codebook may include information that allows UE 120 to compute and/or determine channel state feedback (CSF) associated with the NR frequency band. For example, the NR codebook may include information that identifies a set of predefined precoding matrices, associated with the NR system, based at least in part on which UE 120 may determine a channel quality indicator (CQI), a rank indicator (RI), a precoding matrix indicator (PMI), and/or the like, associated with the NR frequency band. In some aspects, the NR codebook may be different from a codebook associated with the LTE frequency band (i.e., a codebook based at least in part on which channel state feedback, associated with the LTE frequency band, may be determined).

In some aspects, the configuration information may include information that identifies a reporting mode to be used for reporting channel state feedback associated with the NR frequency band. The reporting mode may include information that identifies a manner in which UE 120 is to report the channel state feedback associated with the NR system. For example, the reporting mode may indicate whether UE 120 is to report the channel state feedback, associated with the NR frequency band, in an uplink transmission associated with the LTE system or an uplink transmission associated with the NR system. Additionally, or alternatively, the reporting mode may identify a format (e.g., a LTE-specific format, a NR-specific format) for reporting the channel state feedback associated with the NR system.

As shown by reference number 1110, UE 120 may measure the reference signal associated with the LTE frequency band. For example, UE 120 may measure the reference signal, associated with the LTE frequency band, based at least in part on the resources, identified by the configuration information, that carry the reference signal associated with the LTE frequency band.

As shown by reference number 1115, UE 120 may determine the channel state feedback, associated with the NR frequency band, based at least in part on the NR codebook and the reference signal associated with the LTE frequency band. For example, UE 120 may receive the reference signal, associated with the LTE frequency band, and may determine, based at least in part on one or more indices of the NR codebook, a CQI, a RI, a PMI, and/or the like, associated with the NR frequency band.

As shown by reference number 1120, UE 120 may report the channel state feedback associated with the NR frequency band. For example, UE 120 may determine the channel state feedback, associated with the NR system, and may provide the channel state feedback to BS 110.

In some aspects, UE 120 may report the channel state feedback, associated with the NR frequency band, in accordance with the configured reporting mode. For example, UE 120 may report the channel state feedback, associated with the NR frequency band, in an uplink transmission associated with the LTE system (e.g., using a particular LTE-specific format) or an uplink transmission associated with the NR system (e.g., using a particular NR-specific format) in accordance with the reporting mode configured on UE 120. In some aspects, UE 120 may report the CQI, the RI, the PMI, information that identifies an index of the NR codebook utilized by UE 120, and/or the like.

In some aspects, based at least in part on the channel state feedback reported by UE 120, a NR PDSCH transmission, associated with the NR system, may be scheduled by BS 110 and received by UE 120.

In this way, a reference signal may be shared by the LTE system and the NR system, thereby improving utilization efficiency of the resources in the overlapping NR and LTE frequency bands. Notably, performance of the LTE system is not negatively impacted by use of the reference signal by UE 120 to determine the channel state feedback associated with the NR frequency band (e.g., determination of channel state feedback by a LTE-configured UE is not affected by use of the reference signal by the NR system).

As indicated above, FIG. 11 is provided as an example. Other examples are possible and may differ from what was described with respect to FIG. 11.

Figure 12:
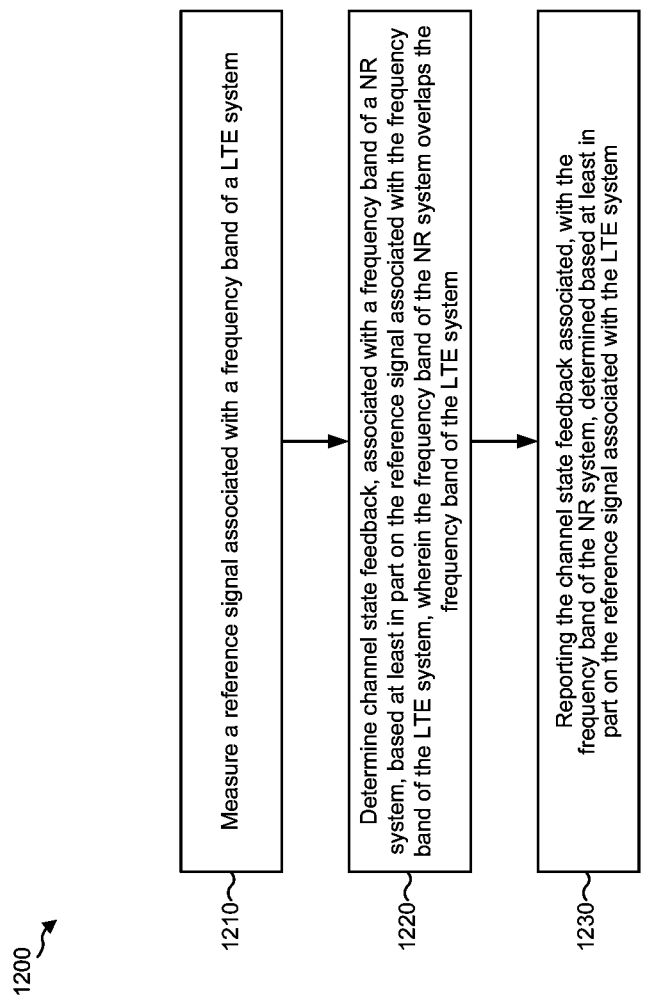
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure.

As shown in FIG. 12, in some aspects, process 1200 may include measuring a reference signal associated with a frequency band of a LTE system (block 1210). For example, UE 120 may measure a reference signal associated with a frequency band of a LTE system, as described above.

As further shown in FIG. 12, in some aspects, process 1200 may include determining channel state feedback, associated with a frequency band of a NR system, based at least in part on the reference signal associated with the frequency band of the LTE system, wherein the frequency band of the NR system overlaps the frequency band of the LTE system (block 1220). For example, UE 120 may determine channel state feedback, associated with a frequency band of a NR system, based at least in part on the reference signal associated with the frequency band of the LTE system, wherein the frequency band of the NR system overlaps the frequency band of the LTE system, as described above.

As further shown in FIG. 12, in some aspects, process 1200 may include reporting the channel state feedback associated, with the frequency band of the NR system, determined based at least in part on the reference signal associated with the LTE system (block 1230). For example, UE 120 may report the channel state feedback associated, with the frequency band of the NR system, determined based at least in part on the reference signal associated with the LTE system, as described above.

Process 1200 may include additional aspects, such as any single aspect or any combination of aspects described below and/or described with regard to any other process described herein.

In some aspects, UE 120 may receive configuration information that signals a set of resources in the frequency band of the LTE system that carry the reference signal associated with the frequency band of the LTE system.

In some aspects, UE 120 may receive configuration information that identifies a NR codebook for determining the channel state feedback associated with the frequency band of the NR system. Here, the NR codebook may different from a LTE codebook for determining channel state feedback associated with the frequency band of the LTE system.

In some aspects, UE 120 may receive configuration information that identifies a reporting mode associated with reporting the channel state feedback. Here, the reporting mode may indicate whether the channel state feedback is reported in an uplink transmission associated with the frequency band of the LTE system or an uplink transmission associated with the frequency band of the NR system, and the UE may be configured to report the channel state feedback in accordance with the reporting mode.

In some aspects, UE 120 may be configured to report the channel state feedback in an uplink transmission associated with the frequency band of the LTE system.

In some aspects, UE 120 may be configured to report the channel state feedback in an uplink transmission associated with the frequency band of the NR system.

In some aspects, the reference signal associated with the frequency band of the LTE system may be a CSI-RS.

In some aspects, the reference signal associated with the frequency band of the LTE system may be included in a set of IMRs associated with the frequency band of the LTE system.

In some aspects, the channel state feedback includes at least one of a CQI, a RI, a PMI, or an index of a codebook associated with determining the channel state feedback.

In some aspects, UE 120 may receive a PDSCH in a downlink transmission associated with the NR system. Here, the PDSCH may be scheduled based at least in part on the reported channel state feedback.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
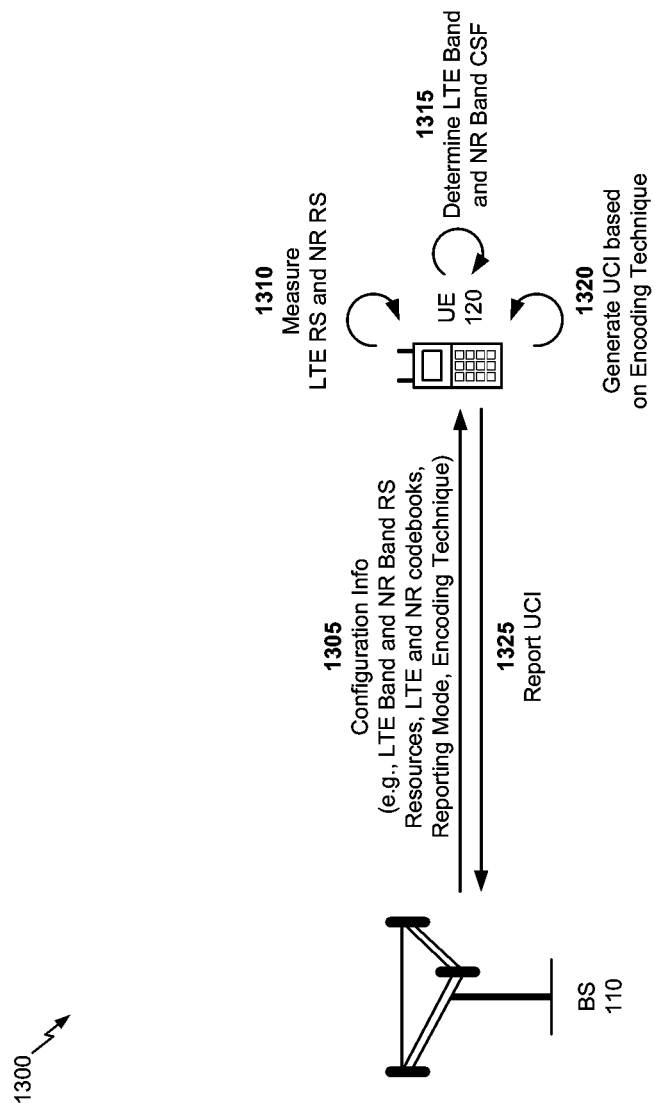
FIG. 13 is a diagram illustrating an example of a first reference signal, associated with a LTE system, and a second reference signal, associated with a NR system, being utilized for determining first channel state feedback, associated with the LTE system, and second channel state feedback associated with the NR system, in accordance with various aspects of the present disclosure.

FIG. 13 is a diagram illustrating an example 1300 of a first reference signal, associated with a LTE system, and a second reference signal, associated with a NR system, being utilized for determining first channel state feedback, associated with the LTE system, and second channel state feedback, associated with the NR system, in accordance with various aspects of the present disclosure.

As shown in FIG. 13, and by reference number 1305, UE 120 may receive, from BS 110, configuration information associated with a LTE frequency band and a NR frequency band. In some aspects, as described above, the NR frequency band may overlap the LTE frequency band.

In some aspects, as shown in FIG. 13, the configuration information may include information that signals resources that carry a first reference signal associated with the LTE frequency band (e.g., resources that carry a CSI-RS associated with the LTE frequency band, a set of IMRs associated with the LTE frequency, and/or the like) and resources that carry a second reference signal associated with the NR frequency band (e.g., resources that carry a CSI-RS associated with the NR frequency band, a set of IMRs associated with the NR frequency, and/or the like). In some aspects, the first set of resources may be the same as the second set of resources (i.e., the first reference signal may be carried in the same set of resources as the second reference signal). Alternatively, the first set of resources may be different from the second set of resources.

In some aspects, UE 120 may determine first channel state feedback, associated with the LTE frequency band, based at least in part on the first reference signal associated with the LTE frequency band, and may determine second channel state feedback, associated with the NR frequency band, based at least in part on the second reference signal associated with the NR frequency band, as described below.

In some aspects, the configuration information may include information that identifies a codebook associated with the LTE frequency band (herein referred to as a LTE codebook) and a codebook associated with the NR frequency band (i.e., a NR codebook). In some aspects, the LTE codebook may include information that allows UE 120 to compute and/or determine the first channel state feedback associated with the LTE frequency band, while the NR codebook may include information that allows UE 120 to compute and/or determine the second channel state feedback associated with the NR frequency band. For example, the LTE codebook may include information that identifies a set of predefined precoding matrices, based at least in part on which UE 120 may determine a CQI, a RI, a PMI, and/or the like, associated with the LTE frequency band. Similarly, the NR codebook may include information that identifies a set of predefined precoding matrices, based at least in part on which UE 120 may determine a CQI, a RI, a PMI, and/or the like, associated with the NR frequency band. In some aspects, the NR codebook may be different from the LTE codebook.

In some aspects, the configuration information may include information that identifies a reporting mode to be used for reporting the first and second channel state feedback. The reporting mode may include information that identifies a manner in which UE 120 is to report the first and second channel state feedback. For example, the reporting mode may indicate whether UE 120 is to report the first and second channel state feedback in an uplink transmission associated with the LTE system or an uplink transmission associated with the NR system. Additionally, or alternatively, the reporting mode may identify a format (e.g., a LTE-specific format, a NR-specific format) for reporting the first and second channel state feedback.

In some aspects, the configuration information may include information that identifies an encoding technique for generating uplink control information (UCI) used to report the first and second channel state feedback. For example, in some aspects, the encoding technique may indicate that UE 120 is to encode a first CQI, associated with the first channel state feedback, in a first set of bits of UCI (e.g., a first set of five bits) and a second CQI, associated with the second channel state feedback, in a second set of bits of UCI (e.g., a second set of five bits) (e.g., such that the first channel state feedback and the second channel state feedback are separately encoded). As another example, in some aspects, the encoding technique may indicate that UE 120 is to encode the first CQI in a first set of bits of UCI (e.g., a set of five bits), and information that identifies a difference (i.e., a delta) between the first CQI and the second CQI in a second set of bits of the UCI (e.g., a set of two bits) (e.g., such that the first channel state feedback and the second channel state feedback are jointly encoded). In this example, the second set of bits may include fewer bits than the first set of bits, which reduces resources consumed when reporting the first and second CQI. Other items of channel state feedback (e.g., a first and second RI, a first and second PMI, and/or the like) may be encoded in a similar manner according to the encoding technique.

As shown by reference number 1310, UE 120 may measure the first reference signal, associated with the LTE frequency band, and the second reference signal associated with the NR frequency band. For example, UE 120 may measure the first reference signal, associated with the LTE frequency band, based at least in part on the first set of resources, identified by the configuration information, that carry the first reference signal associated with the LTE frequency band. Similarly, UE 120 may measure the second reference signal, associated with the NR frequency band, based at least in part on the second set of resources, identified by the configuration information, that carry the second reference signal associated with the NR frequency band.

As shown by reference number 1315, UE 120 may determine the first and second channel state feedback based at least in part on the first reference signal and the second reference signal, respectively. For example, UE 120 may receive the first reference signal and may determine, based at least in part on one or more indices of the LTE codebook, a CQI, a RI, a PMI, and/or the like, associated with the LTE frequency band. Similarly, UE 120 may receive the second reference signal and may determine, based at least in part on one or more indices of the NR codebook, a CQI, a RI, a PMI, and/or the like, associated with the NR frequency band.

As shown by reference number 1320, UE 120 may generate UCI based at least in part on the configured encoding technique. For example, UE 120 may encode both the first channel state feedback and the second channel state feedback in UCI in accordance with the encoding technique configured on UE 120.

As shown by reference number 1325, UE 120 may report the UCI including the encoded first and second channel state feedback associated with the LTE frequency band and the NR frequency band, respectively. For example, UE 120 may report the UCI, including the first and second channel state feedback, to BS 110.

In some aspects, UE 120 may report the UCI in accordance with the configured reporting mode. For example, UE 120 may report the UCI in an uplink transmission associated with the LTE system (e.g., using a particular LTE-specific format) or an uplink transmission associated with the NR system (e.g., using a particular NR-specific format) in accordance with the reporting mode configured on UE 120. In some aspects, UE 120 may report (e.g., in the UCI) information that identifies indices of the LTE codebook and the NR codebook utilized by UE 120 to determine the first and second channel state feedback, respectively.

In some aspects, based at least in part on the first and second channel state feedback reported by UE 120, a NR PDSCH transmission may be scheduled by BS 110 and received by UE 120. In some aspects, the NR PDSCH transmission may be sent in resources typically used for LTE transmissions and/or in resources typically used for NR transmissions.

In this way, a reference signal may be shared by the LTE system and the NR system, thereby improving utilization efficiency of the resources in the overlapping NR and LTE frequency bands. Notably, performance of the LTE system is not negatively impacted by use of the LTE reference signal by UE 120 to determine the channel state feedback associated with the LTE frequency band (e.g., determination of channel state feedback by a LTE-configured UE is not affected by use of the reference signal by the NR system).

As indicated above, FIG. 13 is provided as an example. Other examples are possible and may differ from what was described with respect to FIG. 13.

Figure 14:
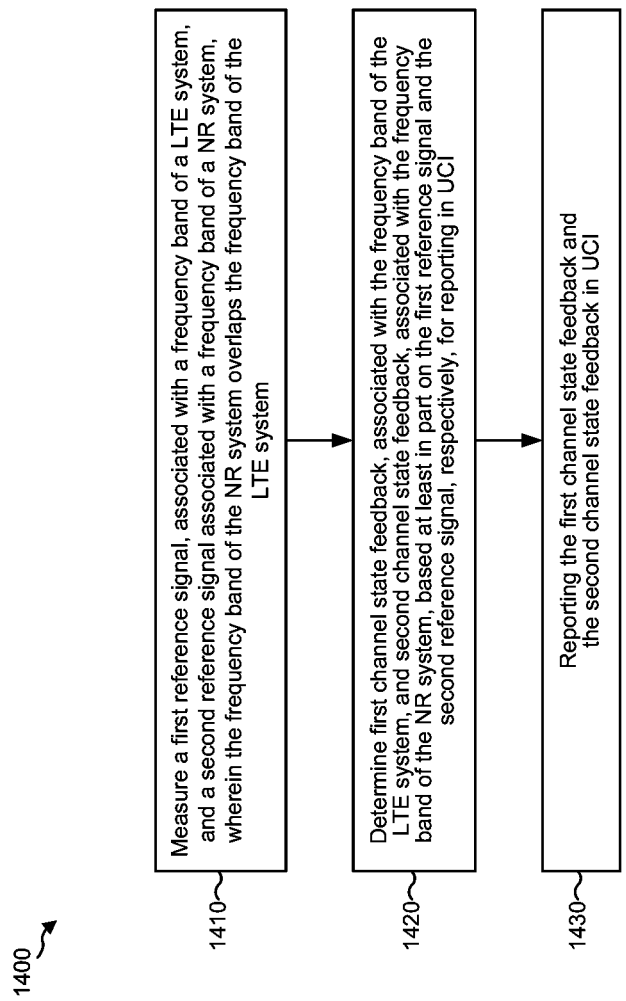
FIG. 14 is a diagram illustrating an example process performed, for example, by a user equipment, in accordance with various aspects of the present disclosure.

FIG. 14 is a diagram illustrating an example process 1400 performed, for example, by a UE, in accordance with various aspects of the present disclosure.

As shown in FIG. 14, in some aspects, process 1400 may include measuring a first reference signal, associated with a frequency band of a LTE system, and a second reference signal associated with a frequency band of a NR system, wherein the frequency band of the NR system overlaps the frequency band of the LTE system (block 1410). For example, UE 120 may measure a first reference signal, associated with a frequency band of a LTE system, and a second reference signal associated with a frequency band of a NR system, wherein the frequency band of the NR system overlaps the frequency band of the LTE system, as described above.

As further shown in FIG. 14, in some aspects, process 1400 may include determining first channel state feedback, associated with the frequency band of the LTE system, and second channel state feedback, associated with the frequency band of the NR system, based at least in part on the first reference signal and the second reference signal, respectively, for reporting in UCI (block 1420). For example, UE 120 may determine first channel state feedback, associated with the frequency band of the NR system, and second channel state feedback, associated with the frequency band of the NR system, based at least in part on the first reference signal and the second reference signal, respectively, for reporting in UCI, as described above.

As further shown in FIG. 14, in some aspects, process 1400 may include reporting the first channel state feedback and the second channel state feedback in UCI (block 1430). For example, UE 120 may report the first channel state feedback and the second channel state feedback in UCI (e.g., jointly encoded in a single message), as described above.

Process 1400 may include additional aspects, such as any single aspect or any combination of aspects described below and/or described with regard to any other process described herein.

In some aspects, the first channel state feedback and the second channel state feedback are reported in the UCI, wherein the first channel state feedback and the second channel state feedback are jointly encoded in the UCI.

In some aspects, UE 120 may receive configuration information that identifies a LTE codebook for determining the first channel state feedback and a NR codebook for determining the second channel state feedback, wherein the first reference signal and the second reference signal are carried in a same set of resources, and wherein the NR codebook is different from the LTE codebook such that the first channel state feedback is different from the second channel state feedback.

In some aspects, UE 120 may receive configuration information that identifies a reporting mode associated with reporting UCI associated with measurements taken in overlapping frequency bands, wherein the reporting mode indicates whether the UCI is to be reported in an uplink transmission associated with the frequency band of the LTE system or an uplink transmission associated with the frequency band of the NR system, and UE 120 is configured to report the UCI in accordance with the reporting mode.

In some aspects, UE 120 may receive configuration information that identifies an encoding technique associated with reporting the UCI, and may generate the UCI, including the first channel state feedback and the second channel state feedback, based at least in part on the encoding technique.

In some aspects, UE 120 may receive configuration information that signals a first set of resources, associated with the frequency band of the LTE system, that carry the first reference signal and a second set of resources, associated with the frequency band of the NR system, that carry the second reference signal. In some aspects, the first set of resources and the second set of resources may be a same set of resources. Alternatively, in some aspects, the first set of resources and the second set of resources may be different sets of resources.

In some aspects, UE 120 may receive configuration information that identifies a LTE codebook for determining the first channel state feedback and a NR codebook for determining the second channel state feedback. Here, the NR codebook may be different from the LTE codebook.

In some aspects, UE 120 may receive configuration information that identifies a reporting mode associated with reporting the UCI. Here, the reporting mode may indicate whether the UCI is to be reported in an uplink transmission associated with the frequency band of the LTE system or an uplink transmission associated with the frequency band of the NR system, and UE 120 may be configured to report the UCI in accordance with the reporting mode.

In some aspects, UE 120 may be configured to report the UCI in an uplink transmission associated with the frequency band of the LTE system.

In some aspects, UE 120 may be configured to report the UCI in an uplink transmission associated with the frequency band of the NR system.

In some aspects, UE 120 may receive configuration information that identifies an encoding technique for generating the UCI, and may generate the UCI, including the first channel state feedback and the second channel state feedback, based at least in part on the encoding technique. In some aspects, UE 120 may be configured to encode the first channel state feedback and the second channel state feedback in a first set of bits and a second set of bits of the UCI, respectively. Alternatively, in some aspects, UE 120 may be configured to encode the first channel state feedback in a first set of bits of the UCI and encode information that identifies a difference between the first channel state feedback and the second channel state feedback in a second set of bits of the UCI. Here, the second set of bits may include fewer bits than the first set of bits.

In some aspects, the first reference signal or the second reference signal may be a CSI-RS.

In some aspects, the first reference signal or the second reference signal may be included in a set of IMRs.

In some aspects, the first channel state feedback or the second channel state feedback includes at least one of a CQI, a RI, a PMI, or an index of a respective codebook.

In some aspects, UE 120 may receive a PDSCH in a downlink transmission associated with the NR system or a downlink transmission associated with the LTE system. Here, the PDSCH may be scheduled based at least in part on the reported UCI.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
operating in a new radio (NR) frequency band; and
communicating with a base station using the NR frequency band,
wherein multiple long term evolution (LTE) frequency bands are overlapped by the NR frequency band in a subframe,
wherein resources in the NR frequency band are concurrently used by a NR system and a LTE system,
wherein a NR transmission is communicated, and
wherein the NR transmission is multiplexed with a LTE transmission in the subframe.

2. The method of claim 1, wherein multiple sub-bands of the NR frequency band overlap the multiple LTE frequency bands.

3. The method of claim 1, further comprising:
communicating the LTE transmission with the base station using an LTE frequency band of the multiple LTE frequency bands.

4. The method of claim 1,
wherein the NR transmission is time division multiplexed with the LTE transmission in a mini-slot within the subframe.

5. The method of claim 1,
wherein the NR transmission is a downlink transmission.

6. The method of claim 1, wherein the resources comprise the subframe.

7. A method for wireless communication performed by a base station, comprising:
operating in a new radio (NR) frequency band; and
communicating with a user equipment using the NR frequency band,
wherein multiple long term evolution (LTE) frequency bands are overlapped by the NR frequency band in a subframe,
wherein resources in the NR frequency band are concurrently used by a NR system and a LTE system,
wherein a NR transmission is communicated, and
wherein the NR transmission is multiplexed with a LTE transmission in the subframe.

8. The method of claim 7, wherein multiple sub-bands of the NR frequency band overlap the multiple LTE frequency bands.

9. The method of claim 7, further comprising:
communicating the LTE transmission with at least one user equipment using an LTE frequency band of the multiple LTE frequency bands.

10. The method of claim 7,
wherein the NR transmission is time division multiplexed with the LTE transmission in a mini-slot within the subframe.

11. The method of claim 7,
wherein the NR transmission is a downlink transmission.

12. A user equipment (UE) for wireless communication, comprising:
a memory; and
one or more processors coupled to the memory, the one or more processors configured to:
operate in a new radio (NR) frequency band; and
communicate with a base station using the NR frequency band,
wherein multiple long term evolution (LTE) frequency bands are overlapped by the NR frequency band in a subframe,
wherein resources in the NR frequency band are concurrently used by a NR system and a LTE system,
wherein a NR transmission is communicated, and
wherein the NR transmission is multiplexed with a LTE transmission in the subframe.

13. The UE of claim 12, wherein multiple sub-bands of the NR frequency band overlap the multiple LTE frequency bands.

14. The UE of claim 12,
wherein the NR transmission is a downlink transmission.

15. The UE of claim 12, wherein the NR frequency band is a frequency band with a subcarrier spacing of 60 kilohertz (kHz).

16. The UE of claim 12, wherein the one or more processors are further configured to:
receive configuration information associated with an LTE frequency band, of the multiple LTE frequency bands, and the NR frequency band.

17. The UE of claim 16, wherein the configuration information is received from the base station.

18. The UE of claim 16, wherein the configuration information includes information indicating that the UE is to use synchronization information for synchronization associated with the NR frequency band.

19. The UE of claim 18, wherein the synchronization information is associated with the LTE frequency band.

20. The UE of claim 16, wherein the configuration information includes information that signals resources that carry a reference signal associated with the NR frequency band.

21. The UE of claim 12, wherein an LTE frequency band, of the multiple LTE frequency bands, is a frequency band with a subcarrier spacing of 15 kilohertz (kHz).

22. The UE of claim 12, wherein the resources comprise the subframe.

23. The UE of claim 12, wherein the one or more processors are further configured to:
receive configuration information, associated with the NR frequency band, in a sub-band of the NR frequency band that does not overlap an LTE frequency band of the multiple LTE frequency bands.

24. The UE of claim 12, wherein the one or more processors are further configured to:
receive configuration information, associated with the NR frequency band, in a different NR frequency band.

25. The UE of claim 12, wherein the one or more processors are further configured to:
receive a reference signal, associated with the NR frequency band, based at least in part on synchronization information associated with an LTE frequency band of the multiple LTE frequency bands.

26. A base station for wireless communication, comprising:
a memory; and
one or more processors coupled to the memory, the one or more processors configured to:
operate in a new radio (NR) frequency band; and
communicate with a user equipment using the NR frequency band,
wherein multiple long term evolution (LTE) frequency bands are overlapped by the NR frequency band in a subframe, wherein resources in the NR frequency band are concurrently used by a NR system and a LTE system,
wherein a NR transmission is communicated, and
wherein the NR transmission is multiplexed with a LTE transmission in the subframe.

27. The base station of claim 26, wherein multiple sub-bands of the NR frequency band overlap the multiple LTE frequency bands.

28. The base station of claim 26,
wherein the NR transmission is a downlink transmission.

29. The base station of claim 26, wherein the NR frequency band is a frequency band with a subcarrier spacing of 60 kilohertz (kHz).

30. The base station of claim 26, wherein the NR transmission is time division multiplexed with the LTE transmission in a mini-slot within the subframe.

* * * * *